United States Patent
Simon

[15] 3,682,066
[45] Aug. 8, 1972

[54] FILM METERING DEVICE FOR PHOTOGRAPHIC CAMERAS

[72] Inventor: Horst Simon, Fellbach, Germany

[73] Assignee: Eastman Kodak Company, Rochester, New York

[22] Filed: Nov. 18, 1969

[21] Appl. No.: 877,788

[30] Foreign Application Priority Data

March 22, 1969 Germany..........P 19 14 775.2

[52] U.S. Cl.............95/31 FM, 95/31 AC, 95/31 FL
[51] Int. Cl.............................................G03b 19/04
[58] Field of Search............95/31 AC, 31 FL, 31 FM

[56] References Cited

UNITED STATES PATENTS

| | | |
|---|---|---|
| 3,148,605 | 9/1964 | Peterson et al. ........95/31 FM |
| 3,416,424 | 12/1968 | Harvey....................95/31 FM |
| 3,487,758 | 1/1970 | Rigoline et al. .........95/31 FM |
| 3,516,465 | 5/1970 | Winkler et al. ..........95/31 FM |
| 3,532,040 | 10/1970 | Ehgartner et al. ......95/31 FM |

*Primary Examiner*—Samuel S. Matthews
*Assistant Examiner*—Michael L. Gettner
*Attorney*—Robert W. Hampton and D. Peter Hochberg

[57] ABSTRACT

A camera mechanism for metering the advancement of film having metering perforations is adapted to prevent damage to the perforations during the metering function. The mechanism includes a metering pawl which drops into a film perforation just prior to the complete advancement of the film by a full frame increment. The metering mechanism further includes a pawl which cooperates with the film advancing member during the final stage of the incremental film advance so as to transport the film by engagement of the metering pawl with the film at a speed at least as great as that imparted to the film by the film advancing member thereby assuring accurate film metering without the possibility of damaging the film. The mechanism is further adapted to prevent incomplete operation of the shutter cocking and film transport member as well as to prevent premature shutter action.

10 Claims, 3 Drawing Figures

HORST SIMON
INVENTOR.

BY

ATTORNEYS

HORST SIMON
INVENTOR.

BY

ATTORNEYS

HORST SIMON
INVENTOR.

ic cameras are known in the art. For example, a photographic camera disclosed by U.S. Pat. No. 3,416,425 which issued on Dec. 17, 1968 in the name of V. Rigolini, comprises a unitary scanning member for locking a film transport device. The scanning member is spring-urged into a film scanning position, in which it rides along the surface of advancing film until it drops into a metering perforation in the film. Upon the latter occurence, the member locks the film transport device. Release of the shutter effects withdrawal of the scanning member from the perforation, and scanning member is spring driven to its initial position.

A device for providing the incremental transport of a film strip in a photographic camera is known from commonly assigned U.S. Pat. No. 3,148,605, which issued on Sept. 15, 1964 in the name of Peterson et al. This device comprises an independently driven locking member which blocks the film drive following the engagement of a film metering perforation by a scanning member, and the subsequent movement of the scanning member by the film strip.

Moreover, a metering device for blocking the film transport mechanism is taught by U.S. Pat. No. 3,532,040 which was issued on Oct. 6, 1970 in the name of Ehgartner et al., in which a locking member and a sensing lever are connected to each other so as to be movable relative to each other. The locking member is pivotally mounted on the sensing lever, and both members are driven by a common spring.

In these known devices, the accurate advancement of film in the predetermined increments is difficult to achieve, and it is possible that the film perforations can be damaged through defects in the film transport locking mechanism when the film transport means has been improperly actuated. Such damage can also cause the film strip not to be advanced by constant increments.

BRIEF SUMMARY OF THE INVENTION

The present invention provides a photographic camera for receiving film having metering discontinuities at predetermined intervals and for advancing the film in precisely controlled predetermined increments such as single frame lengths. A camera according to the invention has a film metering mechanism for controlling the incremental advancement of the film, and comprises a film scanning member which is coupled with the film transport means and movably mounted to effect several camera functions. At the commencement of the advancement of a segment of the film, the scanning member is blocked from engaging the film, and means coupled with the scanning member preventing the premature return movement of the film transport and shutter cocking mechanism. In addition, means are provided for locking the shutter release during the initial operation of the film transport mechanism. The scanning member is urged into engagement with the film during the film advancement for eventually engaging a metering discontinuity. Upon engagement of a film metering discontinuity, the scanning means is driven by the film transport mechanism so that the scanning member moves in the direction of film travel at at least the same speed as the film thereby preventing damage to the film. The scanning member is so moved until it engages a housing portion or the like at which time film transport is arrested. The shutter release is locked in response to completion of the film transport operation.

An object of the present invention is the provision of a camera for receiving film having engageable metering discontinuities thereon, which camera accurately advances film loaded therein in predetermined increments without damage to the film.

It is another object to provide a camera of the aforementioned type having a film metering system which effects the performance of the functions of double exposure prevention, and of locking of the film transport after the film has been advanced by a predetermined increment but prior to release of the shutter.

Still another object is the provision of a camera having a film metering system com prising components which are simple in construction, relatively few in number, and economical to manufacture and assemble.

Other objects will become apparent from the description to follow and the appended claims.

DETAILED DESCRIPTION OF THE INVENTION

Figure 1:
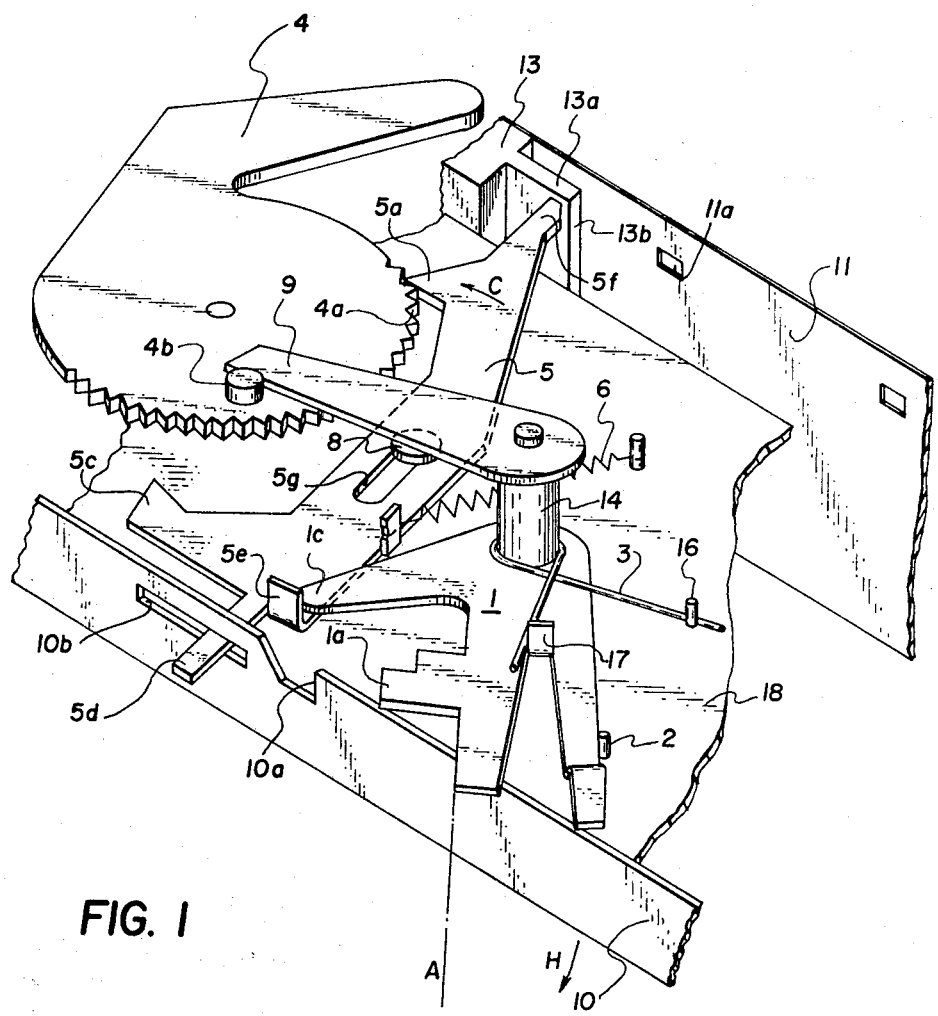
FIG. 1 is a perspective view of a portion of a camera according to the invention showing components of a film metering and a shutter cocking mechanism when the camera is in an initial set condition.

Referring to FIG. 1, a film transport metering device according to the invention is shown in a camera, in the position assumed immediately after the shutter has been released to take a picture. A lever 1, which serves as the drive means for the shutter (not shown), is in position A, and is urged by a leg spring 3 against a detent 2 extending from the camera body 18. Spring 3 is entwined about an axle 14 and in engagement with a stationary detent 16 and an ear 17 on level 3.

A scanning member 5 is provided with an oblong hole 5g, and is pivotally and shiftably supported on a pivot 8. The film transport operation is initiated by turning actuating means in the form of a film advancing and shutter cocking lever 4 in a counterclockwise direction. Rotation of lever 4 (against the return bias of means (not shown) urging lever 4 in a counterclockwise direction) in the clockwise direction effects the transport of film 11 to the left as indicated in the drawings. Scanning member 5 is biased forwardly (out of the plane of the drawing) through the engagement of an offset portion 5e by a return arm 1c of lever 1 so as to place pivot 8 at the rear of slot 5g. Member 5 is further biassed in the direction of arrow C about pivot 8 by a spring 6, and acts to prevent the reverse motion of film advancing and shutter cocking lever 4 by virtue of the engagement of a panel as tab 5a with racket teeth 4a on the periphery of lever 4. The engagement of tab 5a with teeth 4a prevents the return movement of lever 4 before it has traveled through the path necessary to cock the shutter.

Figure 2:
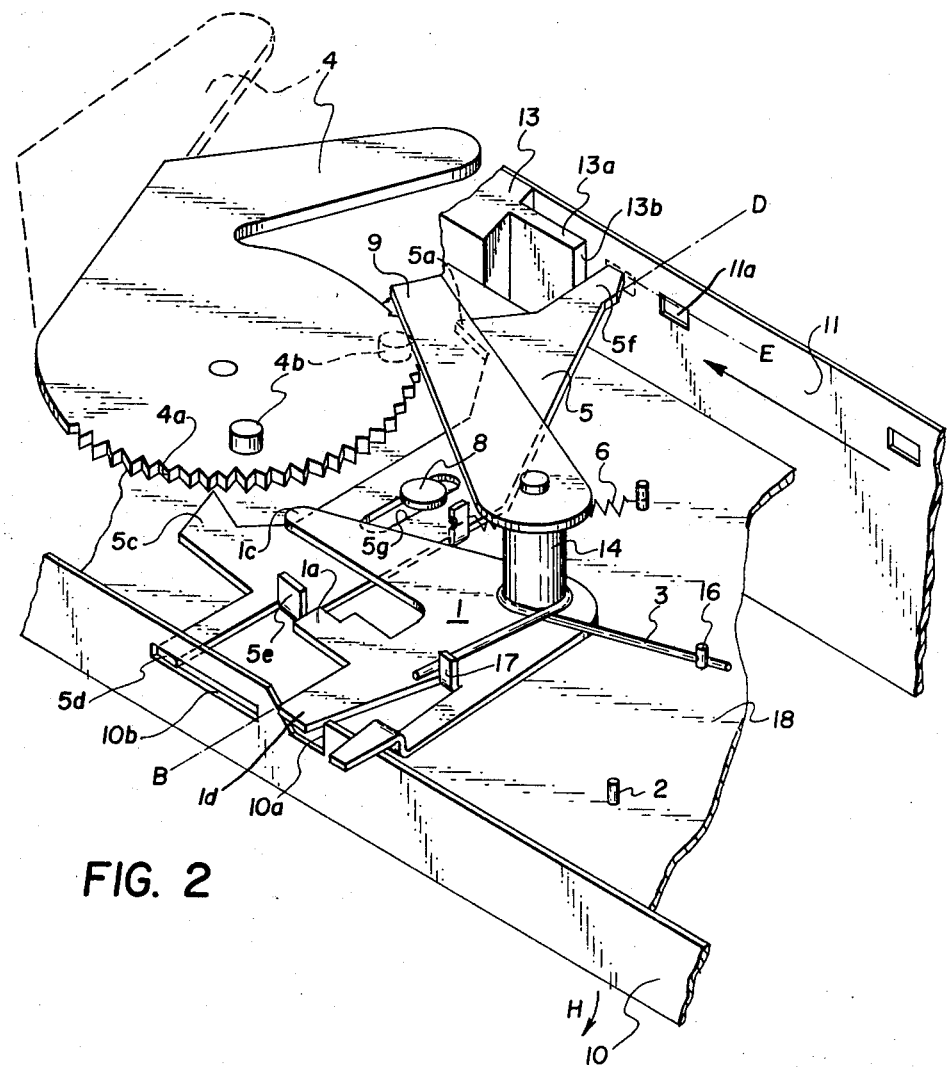
FIG. 2 represents the mechanism shown in FIG. 1 during the film operation.

When cocking lever 4 is rotated counterclockwise to the position indicated by the dotted line in FIG. 2, a switch bolt 4b extending from lever 4 engages and rotates a transmission lever 9, fixed on a rotatably mounted axle 14 to which lever 1 is also fixed. Lever 1, is thus displaced from position A (FIG. 1) to position B (FIG. 2) in response to this rotation of lever 4. When lever 1 reaches position B, it drops into a notch 10a of shutter release member 10 of the camera.

Shortly before reaching position B, a detent arm 1a of lever 1 abuts the offset portion 5e of scanning member 5 and urges scanning member 5 from the position in which the return motion of cocking lever 4 is blocked (where tab 5a is in engagement with teeth 4a) to the film scanning position D. Tab 5f of the scanning member 5 then contacts the surface of film 11 and reaches position E in which it is in longitudinal alignment with metering perforations 11 on the film.

Figure 3:
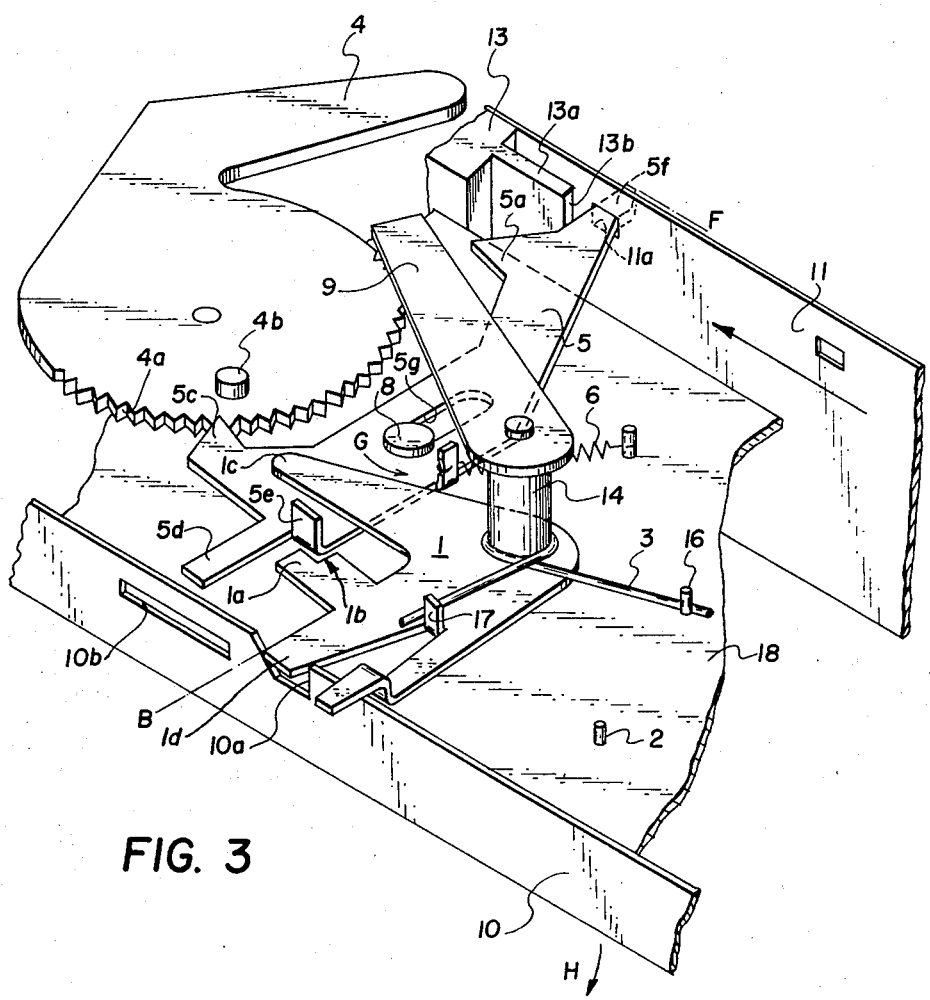
FIG. 3 illustrates the condition of the foregoing mechanism near the end of the operation of transporting a predetermined length of film.

During the next operational step, as cocking lever 4 is further rotated to effect film advancement, a perforation 11a of film 11 (shown in FIG. 3) comes with reach of tab 5f of scanning member 5, and tab 5f is urged into the perforation spring 6. When tab 5f reaches position F (as permitted by slot 5g), a locking arm 5c on member 5 moves into engagement with teeth 4a and offset portion 5e disengages detent arm 1a. As film 11 is advanced with tab 5f in engagement with perforation 11a, scanning member 5 is rotated in the direction G about pivot 8 through the camming action between teeth 4a and arm 5c so that offset portion 5e engages surface 1b, until tab 5f abuts against detent 13b. The film transport is blocked in this position. Scanning member 5 has shifted toward film 11, and pivot 8 has engaged the forwardmost portion of slot 5g. Scanning member 5 is designed so that the relative distances of tab 5F and arm 5C from pivot 8 and the design of the film advancing mechanism ensure that in this last film feed phase, as member 5 rotated about pivot 8 through the camming action between teeth 4a and arm 5c, tab 5f moved film 11 toward element 13 at a speed higher than or, depending on the diameter of the film coil, at least at the same speed as, the film winding mechanism. By this expedient, damage to film perforations resulting from malfunctioning of the film advancing mechanism is avoided, and advancement of the film in constant increments assured.

The shutter of the illustrated camera is released in response to displacement of shutter release member 10 in the direction of arrow H. A shutter release lock 5d (FIG. 1 and FIG. 2) is in its active position when it extends into a slot 10b of shutter release member 10 so that the release lever cannot be moved. When tab 5f of scanning member 5 engages a perforation (see FIG. 3), release lock 5d is withdrawn from slot 10b and the release lever can be actuated.

When lever 4 is rotated from its position shown in FIG. 1 so as to effect the displacement of scanning member 5 in the direction of the film and the rotation of lever 1 clockwise to the position shown in FIG. 2, tab 1d enters notch 10a as explained earlier. The retention of tab 1d in notch 10a prevents the premature actuation of the shutter (element 1 being the shutter driver as mentioned above). Upon actuation of the release lever 10 in the direction of arrow H, lever 1 is released from notch 10a, and is driven counterclockwise spring 3 to operate the shutter. Lever 1 is rotated by spring 3 until it abuts detent 2. During the rotational movement of lever 1, the scanning member 5 is urged to its initial position (FIG. 1) by the engagement of the return arm 1c of the lever 1 with the offset portion 5e of the scanning member 5.

The scanning member 5 is preferably made of one piece as shown. It is, however, possible to made the scanning member of several pieces which may then be assembled into a scanning member so that the cooperating portions of the lever performing the different functions.

The invention has been described in detail with particular reference to preferred embodiments thereof, but it will be understood that variations and modifications can be effected within the spirit and scope of the invention.

I claim:

1. A camera for receiving a film having metering discontinuities spaced at predetermined intervals, said camera comprising:
    means for advancing the film, said advancing means having an active condition wherein said advancing means is movable for advancing film and an inactive condition wherein said advancing means is disabled from advancing film; and
    means for metering the film to assure film advancement in predetermined increments, said metering means comprising:
    scanning means for engaging the film metering discontinuities, said scanning means being movable in the direction of film advancement upon engagement of said scanning means with a metering discontinuity; and
    means actuable upon engagement of said scanning means with a film metering discontinuity for driving said scanning means in the direction of film advancement to drive the film at a speed at least as great as the speed the film is driven by said advancing means.

2. The invention according to claim 1 and further comprising:
    means actuatable for releasing a shutter;
    means for preventing double exposures of a portion of the received film, said means being coupled to said scanning means and having an active condition for preventing actuation of said releasing means and an inactive condition for permitting actuation of said releasing means; and
    means for placing said double exposure preventing means in the inactive condition in response to engagement of said scanning means with a film metering discontinuity.

3. A camera according to claim 1 wherein:

said film advancing means is movable from an initial position for commencing the advancement of film by one of said predetermined increments; and said camera further comprises:

means for locking said film advancing means against return movement to said initial position until said film advancing means has been moved by at least a predetermined amount; and means for unlocking said locking means in response to movement of said advancing means by said predetermined amount.

4. A camera according to claim 3 further comprising means for driving a shutter, said shutter driving means being movable from a release position wherein said means is de-energized to a cocked position from which said shutter driving means is releasable to drive the shutter; and means coupling said shutter driving means and said advancing means, said shutter driving means being movable by said coupling means to said cocked position in response to movement of said advancing means by said predetermined amount, so that said locking means prevents return movement of said advancing means to said initial position until said shutter driving means is cocked.

5. A camera according to claim 1 wherein:

said film advancing means is movable from an initial position for commencing the advancement of one of said predetermined increments of film;

said scanning means has a blocked condition wherein said scanning means is prevented from engaging the film when said advancing means is in the initial position, and a scanning condition wherein said scanning means is engaged with the film and engageable with a metering discontinuity;

and said camera further comprises means operatively coupled to said advancing means for placing said scanning means in the blocked condition in response to movement of said advancing means from the initial position by a predetermined amount.

6. A camera for receiving film having metering perforations at predetermined intervals, said camera comprising:

film transport means rotatable from an initial position in a forward direction for advancing film along a path through said camera, and rotatable in a return direction to return to said initial position;

metering means for assuring that film is advanced only in predetermined increments in response to rotation of said film transport means, said metering means comprising:

scanning means movable to engage the surface and perforations of film in said camera, and having a locking position wherein said scanning means cannot engage the film, a scanning position wherein said scanning means engages the film surface and metering perforations, and a blocking position wherein said scanning means prevents the operation of said film transport means;

film transport locking means coupled to said scanning means for preventing said film transport means from returning to the initial position while said scanning means is in the locking position;

means responsive to the rotation of said film transport means for urging said scanning means from the locking position to the scanning position; and means responsive to the engagement of said scanning means with a metering perforation in the film, and to the subsequent rotation of said film transport means in a forward direction, for urging said scanning means in the direction of film advancement so as to drive the film at at least the speed imparted to the film by said film transport means, and for urging said scanning means from the scanning position to the blocking position.

7. A camera according to claim 6 further comprising:

a shutter having a cocked condition and a released condition;

means for releasing said shutter; and, locking means responsive to the position of said scanning means for permitting operation of said releasing means only when said scanning means is in the blocking position.

8. A camera according to claim 6 wherein said camera further comprises a pivot fixedly mounted in said camera and said scanning means is movably mounted on said fixed pivot so as to be movable from a first to a second pivoting position when said scanning means is in the scanning position, said scanning means being mounted to pivot about said pivot in said first pivoting position when said scanning means is not engaged with a film metering perforation, and being mounted to pivot about said pivot in said second pivoting position when said scanning means is engaged with a film metering perforation; and wherein said means for urging said scanning means in the direction of film advancement comprises:

means responsive to the engagement of said scanning means with a film metering perforation for shifting said scanning means from the first pivoting position to the second pivoting position; and means coupled to said film transport means for pivoting said scanning means in the second pivoting position in response to rotation of said film transport means subsequent to the shifting of said scanning means to said second pivoting position.

9. A camera according to claim 8 wherein said film transport means comprises ratchet means, and said film transport locking means comprises:

first pawl means for engaging said ratchet means when said scanning means is in the blocked position; and second pawl means for engaging said ratchet means when said means is engaged with a film metering perforation.

10. For use in a camera for receiving film with metering discontinuities spaced at predetermined intervals, the camera having a shutter for exposing film:

means for driving the shutter to expose the film, said driving means having a cocked condition wherein said driving means is energized, said driving means being releasable from the cocked condition to a released condition for driving the shutter;

means movable for advancing film in the camera and for cocking said shutter driving means;

means for metering the film to assure advancement of the film in predetermined increments, said metering means comprising scanning means for engaging the film discontinuities said scanning means being adapted to move in the direction of film advancement upon emgagement of said scanning means with a metering discontinuity;

means responsive to the engagement of said scanning means with a metering discontinuity for moving said scanning means in the direction of film advancement at a speed at least as great as that at which the film is being advanced by said advancing means; and means for releasably locking said advancing and cocking means against movement in response to movement of said scanning means by a predetermined amount while in engagement with a metering discontinuity.

* * * * *

UNITED STATES PATENT OFFICE
CERTIFICATE OF CORRECTION

PO-1050 (5/69)

Patent No. 3,682,066      Dated August 8, 1972

Inventor(s) Horst Simon

It is certified that error appears in the above-identified patent and that said Letters Patent are hereby corrected as shown below:

Column 2, line 18    please delete "locked" and substitute --unlocked--

Column 2, line 45    after "film" insert --transport--

Column 2, line 60    please delete "level 3" and substitute --lever 1--

Column 3, line 9    please delete "panel as" and substitute --pawl on--

Column 3, line 9    please delete "racket" and substitute --ratchet--

Column 3, line 52    please delete "ensure" and substitute --insure--

Column 4, line 13    after "counterclockwise" insert --by--

Column 4, line 22    please delete "made" and substitute --make--

Column 6, line 53    after "said" insert --scanning--

Column 7, line 3    please delete "emgagement" and substitute --engagement--

Signed and sealed this 10th day of April 1973.

(SEAL)
Attest:

EDWARD M. FLETCHER, JR.
Attesting Officer

ROBERT GOTTSCHALK
Commissioner of Patents